US006944828B2

(12) United States Patent
Gao et al.

(10) Patent No.: US 6,944,828 B2
(45) Date of Patent: Sep. 13, 2005

(54) SYSTEM AND METHOD FOR RETRIEVING AND EDITING THE DATA STRUCTURE OF AN HTML UI CONTROL

(75) Inventors: Yang Gao, Fremont, CA (US); Zheng John Shi, Fremont, CA (US); Shun Gao, Fremont, CA (US); Armeen Mazda, Tiburon, CA (US)

(73) Assignee: Appeon Corporation, Hong Kong (HK)

( * ) Notice: Subject to any disclaimer, the term of this patent is extended or adjusted under 35 U.S.C. 154(b) by 567 days.

(21) Appl. No.: 10/014,139

(22) Filed: Dec. 13, 2001

(65) Prior Publication Data

US 2003/0112274 A1 Jun. 19, 2003

(51) Int. Cl.[7] .......................... G06F 15/00; G06F 17/00; G06F 17/21; G06F 3/00; G06F 9/00
(52) U.S. Cl. ....................... 715/760; 715/513; 715/733; 715/744; 715/900; 715/968; 709/203; 707/3; 707/104.1
(58) Field of Search ................................ 345/760, 779, 345/733, 744; 705/14; 707/104.1; 715/513, 739, 760, 779, 900, 968; 709/203

(56) References Cited

U.S. PATENT DOCUMENTS 5,801,702 A * 9/1998 Dolan et al. ................. 715/854
5,920,316 A * 7/1999 Oran et al. .................. 345/779
6,169,992 B1 * 1/2001 Beall et al. ............. 707/103 R
6,175,863 B1 * 1/2001 Belfiore et al. ............. 709/218

OTHER PUBLICATIONS

"LiveWire Developer's Guide". Netscape Communications Corporation 1996 [Online] Available http://docsrv.sco.com/INT_LiveWire/CONTENTS.html.*
Cui, Hang and Zaiane, Osmar R. "Hierarchical Structural Approach to Improving the Browsability of Web Search Engine Results". University of Alberta.*

* cited by examiner

Primary Examiner—John Cabeca
Assistant Examiner—Namitha Pillai
(74) Attorney, Agent, or Firm—Patterson, Thuente, Skaar & Christensen, P.A.

(57) ABSTRACT

The present invention provides a system and method for retrieving and editing the data structure of a HTML UI Control, such as a treeview. The system and method have the capability to synchronize the data structure of a displayed HTML UI Control in a Web page with its corresponding data structure stored in an information system at a server, without refreshing said Web page. The present invention utilizes JavaScript to temporarily store the data structure of a displayed HTML UI Control. The JavaScript also has the capability to search and modify a corresponding information system at a server. One way to achieve this capability is by utilizing a browser-based Remote Procedure Call (RPC) and specialized business logic at the server to carry out server-side tasks on said information system.

46 Claims, 3 Drawing Sheets

SYSTEM AND METHOD FOR RETRIEVING AND EDITING THE DATA STRUCTURE OF AN HTML UI CONTROL

CROSS-REFERENCE TO RELATED APPLICATIONS

U.S. application Ser. No. 09/916,252 filed Jul. 30, 2001 and U.S. application Ser. No. 09/916,253 filed Jul. 30, 2001, contain information relevant to this application. The methods claimed in said filed applications can be used to enable the browser-based remote procedure call (RPC) utilized by this invention. Said methods are non-essential, however, since a number of other methods could be utilized.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

The present invention relates generally to displaying and editing data on the Internet, and more particularly to retrieving and editing the data structure of a HTML UI (User Interface) Control.

2. Description of the Related Art

End users interact with modern computer applications through a graphical user interface (GUI). A GUI utilizes various graphical elements, such as icons, menus, forms, grids, etc. End users interact with these graphical elements using the keyboard and/or some type of pointing or selecting device, such as a mouse. By interacting with these various graphical elements, end users may carry out certain tasks or functions, such as navigation, data entry, and so on.

Of the various purposes that the GUI serves, the GUI's navigation function is vital to the usability of most applications. A properly developed navigation system empowers end users to quickly find the information they need and act upon it. One example of a commonly used navigation system is the Start menu in the Microsoft Windows operating system (OS). The Start menu allows end users to quickly find a desired application and start it. The essentialness of the navigation system is made evident by the fact that most all applications utilize it in one form or another.

Historically, one of the most effective navigation systems has been the treeview, as seen in traditional PC-based applications such as Microsoft's Windows Explorer. The treeview displays information in a hierarchical order with the broadest topic displayed at the top or the root and related items stored underneath or in nodes. Each node can have one or more child nodes, which in turn can contain additional child nodes. This hierarchical nature of the treeview works well for presenting large amounts of data that can be logically grouped. End users also prefer this type of navigation because the organized layout of the treeview helps them reach their desired information with a minimum number of steps (e.g. mouse clicks).

When it comes to managing collections of information resources, such as PC files, Web pages, and emails, the treeview is indispensable and used everyday by everyone. The most widespread and common use of a treeview is for file management (e.g. Microsoft Windows Explorer). End users manage the files on their PC's hard drive through edits performed on the displayed treeview, such as adding, deleting, and renaming interior nodes (i.e. folders) and leaves (i.e. files) of the treeview. Treeviews are also used in many other applications that involve navigating and managing collections of information resources. For example, treeviews are utilized to navigate and manage Web page bookmarks (e.g. Microsoft Internet Explorer, Netscape Navigator), emails (e.g. Microsoft Outlook, Eudora), and newsgroup articles (e.g. Microsoft Outlook Express Newsreader, Forte Free Agent).

Today's new generation of Web-based applications lack the powerful treeview of traditional PC-based applications. Early Web-based navigation systems were nothing more than various logical groupings or sets of hyperlinks presented on several Web pages. Such early navigation systems were poor at displaying a large number of hyperlinks. They either overwhelmed end users with excessive information or forced them to navigate through and download many Web pages. The much advancement in Web browser technology has enabled programmers to mimic the treeview through a Web interface; however, these treeviews are significantly less powerful than their PC-based counterparts. Generally speaking, today's treeview solutions force end users to trade functionality with speed, reliability, and security.

There are three basic groupings of treeview based on the type of technology utilized. These treeviews are grouped as Plugin-based treeviews, HTML-based treeviews, and XML-based treeviews. The shortcomings of various treeview solutions are discussed in detail below.

Plugin-based treeviews mimic the functionality of PC-based treeviews but at a hefty price. Such treeviews typically utilize either Java Applet or ActiveX technology, which are regarded as being inconvenient, slow, unreliable, and posing serious system security risks for end users. They are inconvenient because end users must generally download a Web browser plugin (depending on the type of Web browser) and periodically maintain it by downloading updates. They are slow because end users must download a relatively large amount of program code, and then wait for that code to initialize at the Web browser. They are unreliable because they are precompiled, which bypasses the Web browser's debugging feature. They pose serious system security risks because they have full read and write privileges to the end user's entire hard drive. All in all, end users must give up a lot to get the functionality of PC-based treeviews within a Web browser.

Although HTML-based treeviews overcome the pitfalls of Plugin-based treeviews, they simply lack in functionality and scalability. HTML-based treeviews are implemented using standard JavaScript and DHTML, and thus lack the server connectivity of their Plugin-based counterparts. That is, each time an interaction with the server is made, such as saving an edit made to the tree, the Web page must be refreshed. These page refreshes quickly add up as end users work, robbing them of precious time and lowering productivity. As a result, HTML-based treeviews are typically read-only so that no trips to the server are necessary. Since edits cannot be performed, such treeviews can only be used for navigating and not managing information resources. Also, the lack of server connectivity forces HTML-based treeviews to preload all its data that could be megabytes of information for larger treeviews. Consequently, HTML-based treeviews do not scale to accommodate large treeviews. These serious limitations cause HTML-based treeviews to be utilized for navigation purposes only in the context of small collections of information resources.

XML-based treeviews overcome the scalability issues of HTML-based treeviews, but still lack in functionality. XML-based treeviews add the ability to load data from an XML file to the HTML-based treeview. Though largely similar to its HTML-based counterpart, XML-based treeviews can be designed to scale to support large treeviews. This scalability comes from the fact that XML allows for read-only server connectivity. That is, XML data can be loaded into a displayed Web page at the Web browser repetitively, without incurring a page refresh. Consequently, the treeview can be engineered to incrementally load data as an end user interacts with the displayed treeview. Any editing of an XML-based treeview, however, must be done via a similar database interaction as HTML-based treeviews, which incurs a page refresh. Consequently, XML-based treeviews are typically utilized only for navigating collections of information resources.

The shortcomings of the various treeview solutions examined above are inherited from the technology utilized. As a result, other UI Controls, such as forms, grids, listviews, and menus, suffer from similar shortcomings. Specifically, the usability and scalability of other HTML UI controls is compromised, much in the same way as HTML-based treeviews, by the lack of server connectivity.

From the discussion above, it should be apparent that there is a need for an HTML-based treeview that can be used to navigate and manage large collections of information resources. More generally, it should be apparent that there is a need to improve the scalability of HTML UI Controls that display relatively large data structures, and enable HTML UI Controls to establish server connectivity as necessary without incurring a page refresh. The present invention fulfills this need.

BRIEF SUMMARY OF THE INVENTION

To overcome the shortcomings of the prior art described above, it is an object of the present invention to provide an improved method for retrieving the data structure of a HTML UI Control.

It is another object of the present invention to provide an improved method for editing the data structure of a HTML UI Control.

Still another object of the present invention is to provide an improved system and method for deploying a HTML UI Control that does not require Web browser plugins.

Briefly stated, the present invention provides a system and method for retrieving and editing the data structure of a HTML UI Control, such as a treeview. The system and method have the capability to synchronize the data structure of a displayed HTML UI Control in a Web page with its corresponding data structure stored in an information system at a server, without refreshing said Web page.

The present invention utilizes JavaScript to temporarily store the data structure of a displayed HTML UI Control. The JavaScript also has the capability to search and modify a corresponding information system at a server. One way to achieve this capability is by utilizing a browser-based Remote Procedure Call (RPC) and specialized business logic at the server to carry out server-side tasks on said information system.

In a method according to the present invention, a Web page is loaded at a client Web browser. This Web page contains a Client-Side Data Manager, which temporarily stores the data structure of a displayed HTML UI Control of a Web page. This Web page also contains a Client-Side Proxy, which establishes a communication channel between the Client-Side Data Manager and a Server-Side Data Query Engine. Based on an event, such as an end-user's mouse click, a module of the Client-Side Data Manager is invoked to evaluate the event. The module sends a request to execute a specified query module of the Server-Side Data Query Engine, along with some parameters, to a Client-Side Proxy. The Client-Side Proxy packages the request into a universal resource locator (URL) and executes a HTTP request through the Web browser. The HTTP request arrives from a Web browser to a Web server. The Web server passes the HTTP request to a Server-Side Proxy. The Server-Side Proxy unpacks the request and executes the specified Query module of the Server-Side Data Query Engine. The specified Query module performs a query upon an information system. A formatted string is generated containing the query results, which is returned to the Server-Side Proxy. The Server-Side Proxy packages the results into a HTTP response. The Web server returns the HTTP response to the Web browser. At the Web browser, the Client-Side Proxy receives and unpacks the HTTP response, making the string available to the Client-Side Data Manager. The Client-Side Data Manager parses the string, evaluates the query results, and acts accordingly.

An advantage of the present invention is that it greatly reduces the time required for end users to initially load HTML UI Controls, such as a treeview, that have a large data structure.

Still another advantage of the present invention is that it greatly reduces the time required for end users to perform editing tasks on a HTML UI Control, such as adding a new node to a displayed treeview.

Still another advantage of the present invention is that it offers improved scalability of the back-end and reduced bandwidth consumption.

Yet another advantage of the present invention is that the sole use of HTML and JavaScript provides a solution that can be automatically supported on a wide variety of standard Web browsers already in use today by the majority of end users.

The above, as well as additional objects, features and advantages of the present invention will become apparent in the following detailed written description.

DETAILED DESCRIPTION OF THE INVENTION

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage devices such as fixed (hard) drives, diskettes, optical disks, magnetic tape, semiconductor memories such as ROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention.

Figure 1:
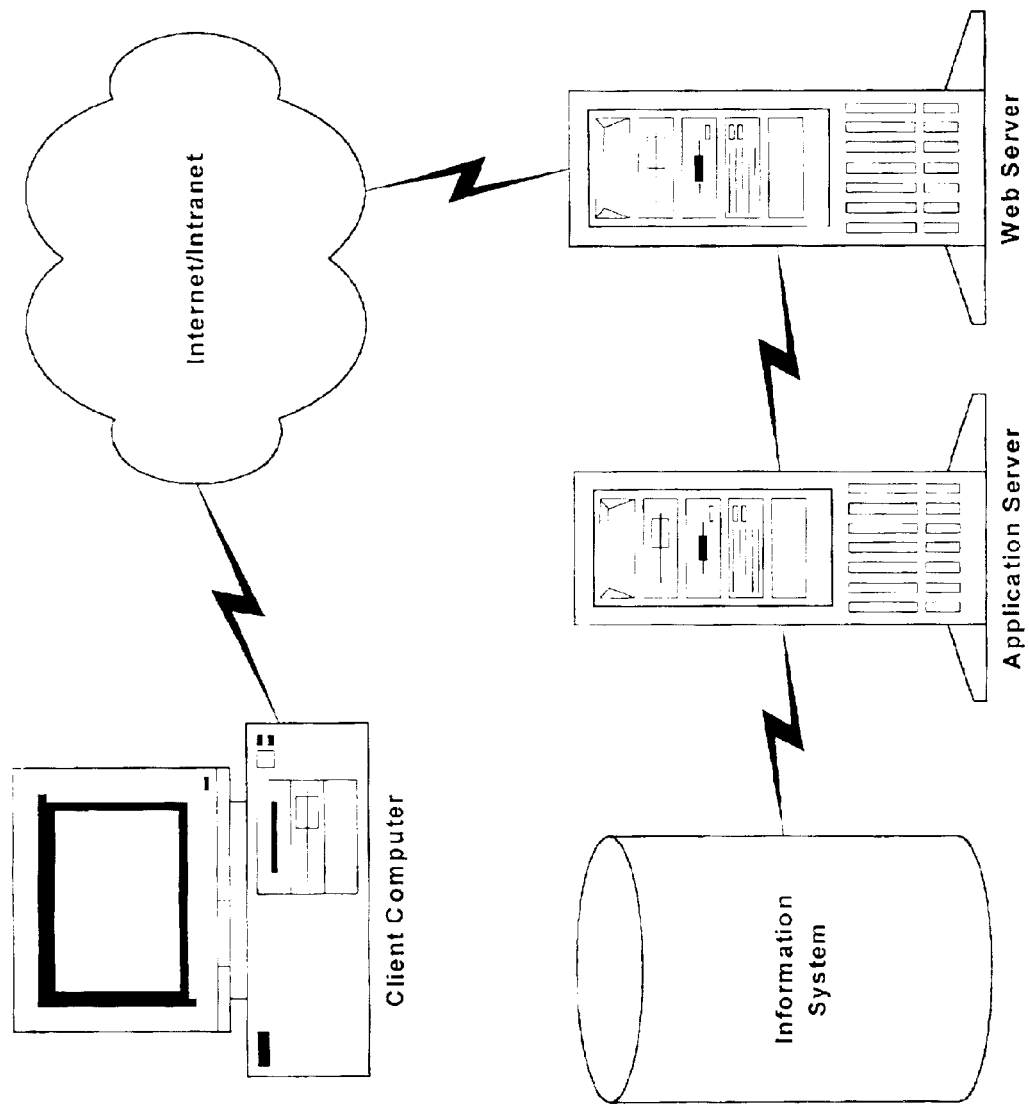
FIG. 1 illustrates a typical networked computer system that is suitable for practicing the preferred embodiment of the present invention.

The presently preferred method and apparatus, referring to FIG. 1, takes place between a client and a server in an interconnected network of computers such as the Internet or intranet.

Figure 2:
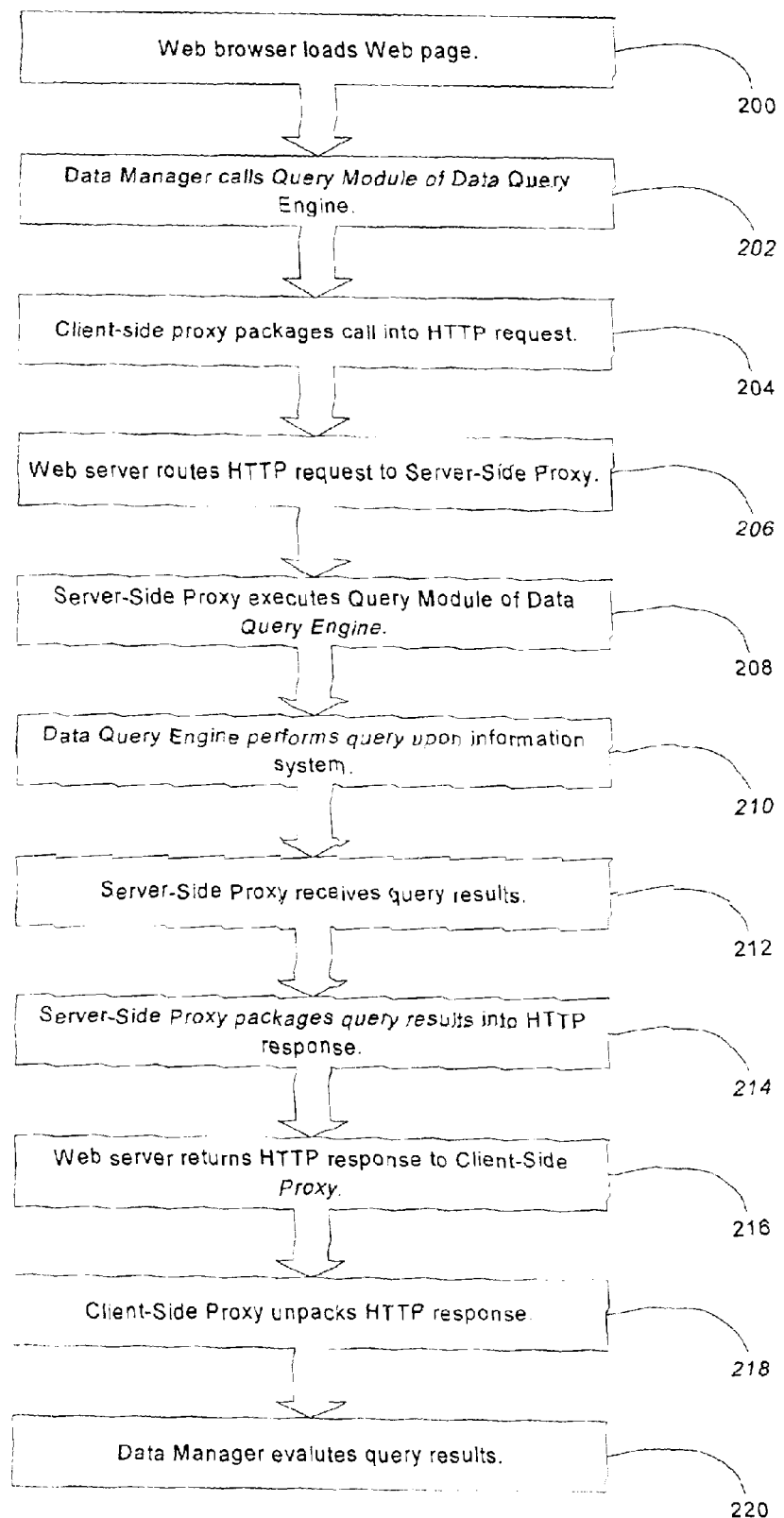
FIG. 2 is a flow chart generally illustrating the principal steps of a presently preferred embodiment of the present invention.

FIG. 2 is a flow diagram illustrating the general steps of the present invention. In a first step, illustrated by box 200, at least one Web page is loaded at a client Web browser that contains a Client-Side Data Manager and a Client-Side Proxy. A purpose of the Client-Side Data Manager is to temporarily store the data structure of displayed HTML UI controls, such as a treeview. The data structure is stored in a JavaScript object, such as a multi-dimensional array. Another purpose of the Client-Side Data Manager is to evaluate browser events and execute the appropriate query modules of a Server-Side Data Query Engine. The purpose of the Client-Side Proxy is to establish a communication channel between the Client-Side Data Manager and the Server-Side Data Query Engine, without refreshing the displayed Web page. At 202, the browser detects an event, such as an end-user's mouse click, which invokes a module of the Client-Side Data Manager to evaluate the event. The module makes a remote procedure call (RPC) by sending a request to execute a query module of a Server-Side Data Query Engine to the Client-Side Proxy. The request contains at least one function name along with at least one parameter. At 204, the Client-Side Proxy receives the RPC or request and packages it into a universal resource locator (URL). The Client-Side proxy provides a function that is called by the module of the Client-Side Data Manager. This function appends the parameters of the RPC to the URL. The browser builds a HTTP request for this URL and sends it over the Internet or an intranet to a Web server. At 206, the HTTP request arrives from the Web browser to the Web server. The Web server passes the HTTP request to the Server-Side Proxy. At 208, the Server-Side Proxy unpacks the request and executes the specified query module of the Server-Side Data Query Engine in 210. At 210, the specified Query module evaluates the passed-in parameters and performs a query upon an information system, such as a database. Possible queries performed include select query, delete query, update query, and insert query. At 212, the query results are broken down into various units and reassembled into a long single string that is delimited by various characters, such as asterisks and pipelines. This string is delimited in a systematic way that preserves the meaning and relationships of the data. This string is then returned to the Server-Side Proxy in 214. At 214, the Server-Side Proxy packages the results into a HTTP response, such as a dynamically generated HTML page. At 216, the Web server receives the HTTP response from the Server-Side Proxy and returns it to the Web browser over the Internet or an intranet. At 218, the HTTP response arrives to the Web browser. The Client-Side Proxy now unpacks the HTTP response and makes it available to the Client-Side Data Manager by executing a corresponding callback function. The callback function receives the formatted string as a parameter. At 220, the Client-Side Data Manager systematically parses the string, evaluates the query results, and performs at least one of three general tasks. First, it evaluates whether the query was successfully performed. Secondly, it updates its data structure with the query results or based on the query results. Thirdly, it notifies corresponding HTML UI Controls that the data structure has changed.

Figure 3:
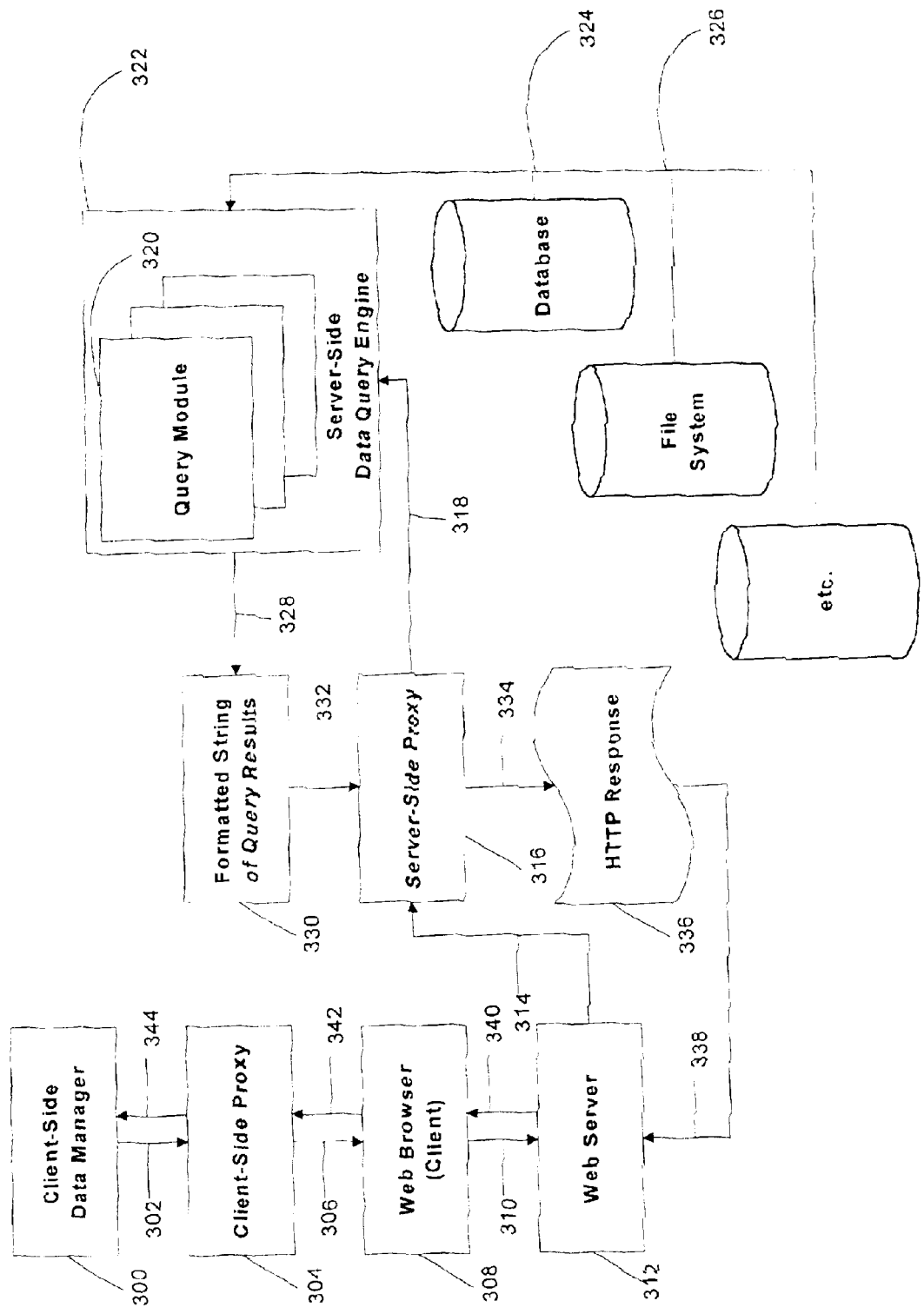
FIG. 3 is a block diagram illustrating a system according to the preferred embodiment.

A system implementing a preferred present embodiment is shown and described in connection with FIG. 3. The Client-Side Data Manager 300 sends a request over path 302 to execute a RPC to the Client-Side Proxy 304. Both the Client-Side Data Manager 300 and the Client-Side Proxy 304 are implemented as JavaScript objects, and thus both reside within a Web page displayed in Web browser 308. The Client-Side Proxy 304 packages the request into a URL and passes it over path 306 to the Web browser 308. The Web browser 308 can be of any type (e.g. Netscape, Microsoft) and of any version (e.g. 4.0) so long as JavaScript support is provided. The Web browser 308 sends a HTTP request over path 310 to Web server 312. Web server 312 can be of any type so long as it has the capability to dynamically generate a HTML page or to access an application server. The Web server 312 extracts the URL from the Web browser 308 and passes it over path 314 to the Server-Side Proxy 316. The Server-Side Proxy can be implemented in a number of ways, such as several VBScript functions in an ASP page, a Java Servlet, etc. Depending on the implementation, the Server-Side Proxy may reside on Web server 312 or a separate application server. The Server-Side Proxy 316 extracts parameters attached at the end of the URL, and invokes over path 318 the appropriate query module 320 of the Server-Side Data Query Engine 322. The Server-Side Data Query Engine may be implemented using various technologies, and as such, may reside on Web server 312 or a separate application server. The Query module 322 queries the information system. The information system can be, for example, a database 324, a file system 326, etc. The formatted string of query results 330 is returned back to the Server-Side Proxy 316, which is then packaged into the HTTP response 336. The Web server 312 returns the HTTP response 336 over path 340 to the Web browser 308. The Client-Side Proxy 304 accesses the HTTP response 336 over path 342. Here, the Client-Side Proxy 304 unpacks the HTTP response 336 and passes the results over path 344 to the Client-Side Data Manager 300.

A number of different methods can be utilized to enable the browser-based RPC over HTTP. The two recommended methods are as defined in U.S. application Ser. No. 09/916, 253 filed Jul. 30, 2001 (first method) and U.S. application Ser. No. 09/916,252 filed Jul. 30, 2001 (second method). The first method executes the RPC as a HTTP "GET" request through the HTML <script> tag and receives the HTTP response through the same HTML <script> tag. This method can be used on any Web browser (e.g. Netscape, Microsoft) and on any version (e.g. 4.0) that is capable of supporting JavaScript. The one limitation of this method is that the HTTP requests, which are "GET" requests, cannot contain more than 1024 bytes of data; however, HTTP responses can contain data of any size. Thus this limitation prevents large amounts of data to be uploaded or sent to a server through a single request. The second method executes the RPC as a HTTP "POST" request through the HTML <form> tag and receives the HTTP response through the HTML <iframe> tag. This method can only be used on a Web browser that supports the HTML <iframe> tag. Currently, only Microsoft Web browsers version 4.0 and above provide support for this method. An advantage of this method over the first, however, is that both the HTTP request and the HTTP response can contain data of any size.

HTML UI Controls that are used to display or edit a data structure, such as forms, grids, and treeviews, are best suited to benefit from the present invention. Since such HTML UI Controls depend on a data structure that resides at a server, these UI Controls can utilize the present invention with little to no modification to achieve the enhanced version. Non-traditional HTML-based UI Controls or even a single HTML element (e.g. text box), however, may also benefit by enhancement from the present invention.

The following example covers in some detail how the present invention can be used to enable a displayed treeview that can incrementally read and write information to an information system:

Assume that the information system, a database, contains a representation of the tree data structure shown below:

TOP
+-A.
+-A.1
+-A.2
+-B
+-B.1
   +-B.1.1
   +-B.1.2
+-B.2
   +-B.2.1
   +-B.2.2

Also assume that the Client-Side Data Manager contains only the first level of said tree data structure. Therefore the data structure of the Client-Side Data Manager would be the following:

TOP
+-A.
+-B

The following represents a case where the children of a node must be retrieved from the information system. For example, if an end user expands tree node A, the Client-Side Data Manager must load the children of node A from the database. Thus the Client-Side Data Manager invokes the select query module of the Server-Side Data Query Engine, and passes the node ID that data must be loaded. In this example, "A" is passed as the parameter to the select query module. A select query on the database for the children of node A returns a formatted string containing the status of the operation, the children of node A and any associated data. In this example, the formatted string is delimited as follows: asterisks separate the error status from the data; pipelines separate each child node; and commas separate the associated data of each child node. It is recommended, however, that invisible characters, such as ASCII char 001 (□), be used as string delimiters for a real-life implementation. If the select query module successfully retrieved the data from the database, the formatted string returned for this example would be "*OK*|A.1,null|A.2,null|*". If the select query module encountered an error, such as a database connection error, the formatted string returned would be "*ERROR*Database Connection Failed*". The Client-Side Data Manager parses the formatted string and first evaluates the status. If an error has occurred, an error message is displayed to the end user and the data structure of the Client-Side Data Manager is unchanged. Otherwise, the child nodes and any associated data are extracted from the formatted string and the data structure of the Client-Side Data Manger is updated accordingly. In this example, the two child nodes A.1 and A.2 are extracted, and the data structure of the Client-Side Data Manager is updated as shown below:

TOP
+-A.
+-A.1
+-A.2
+-B

The following represents a case where a new node is added to the tree shown above. For example, if an end user adds the tree node A.3, the Client-Side Data Manager must add node A.3 to the database. Thus the Client-Side Data Manager invokes the insert query module of the Server-Side Data Query Engine, and passes the parent node ID, the node ID that must be added along with any associated data. In this example, "A" is passed as the parent ID, "A.3" is passed as the node ID, and a "null" value is passed for the associated data to the insert query module. A insert query on the database for node A.3 returns a formatted string containing the status of the operation and the node ID that the operation was performed on. In this example, the formatted string is delimited as follows: asterisks separate the error status from the data; pipelines separate the error message from the node ID. If the insert query module successfully added the data to the database, the formatted string returned for this example would be "*OK*A.3*". If the insert query module encountered an error, such as a record already exists error, the formatted string returned would be "*ERROR*|Record Already Exists|A.3|*". The Client-Side Data Manager parses the formatted string and first evaluates the status. If an error has occurred, an error message is displayed to the end user and the data structure of the Client-Side Data Manager is unchanged. Otherwise, the new node is added to the data structure of the Client-Side Data Manger. In this example, the node A.3 is added under the parent node A, and the data structure of the Client-Side Data Manager is updated as shown below:

TOP
+-A.
+-A.1
+-A.2
+-A.3
+-B

The following represents a case where a node and all of its children (if any) are deleted from the tree shown above. For example, if an end user deletes tree node A.2, the Client-Side Data Manager must delete node A.2 from the database. Thus the Client-Side Data Manager invokes the delete query module of the Server-Side Data Query Engine, and passes the node ID that must be deleted. In this example, "A.2" is passed as the parameter to the delete query module. A delete query on the database for node A.2 returns a formatted string containing the status of the operation and the node ID that the operation was performed on. In this example, the formatted string is delimited as follows: asterisks separate the error status from the data; pipelines separate the error message from the node ID. If the delete query module successfully deleted the data from the database, the formatted string returned for this example would be "*OK*A.2*". If the delete query module encountered an error, such as a record does not exist error, the formatted string returned would be "*ERROR*|Record Does Not Exist|A.2|*". The Client-Side Data Manager parses the formatted string and first evaluates the status. If an error has occurred, an error message is displayed to the end user and the data structure of the Client-Side Data Manager is unchanged. Otherwise, the node and all of its children are deleted from the data structure of the Client-Side Data Manger. In this example, the node A.2 is deleted, and the data structure of the Client-Side Data Manager is updated as shown below:

TOP
+-A.
+-A.1
+-A.3
+-B

Lastly, the following represents a case where a node of the tree shown above is modified. For example, if an end user changes the data associated with tree node A.3, the Client-Side Data Manager must update the data associated with node A.3 in the database. Thus the Client-Side Data Manager invokes the update query module of the Server-Side Data Query Engine, and passes the node ID that must be modified along with any updated associated data. In this example, "A.3" is passed as node ID, and "This is the associated data" is passed as the new associated data to the update query module. An update query on the database for node A.3 returns a formatted string containing the status of the operation and the node ID that the operation was performed on. In this example, the formatted string is delimited as follows: asterisks separate the error status from the data; pipelines separate the error message from the node ID. If the update query module successfully updated the associated data in the database, the formatted string returned for this example would be "*OK*A.3*". If the update query module encountered an error, such as a record locked error, the formatted string returned would be "*ERROR*|Record Locked|A.3|*". The Client-Side Data Manager parses the formatted string and first evaluates the status. If an error has occurred, an error message is displayed to the end user and the data structure of the Client-Side Data Manager is unchanged. Otherwise, the associated data of the node is updated in the data structure of the Client-Side Data Manger. In this example, the associated data for node A.3. is changed from a null value to "This is the associated data". This change in data structure of the Client-Side Data Manager is shown below in parentheses:

TOP
+-A.
+-A.1
+-A.3 (This is the associated data)
+-B

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited in scope only as specified in the appended claims.

We claim:

1. A method for retrieving and editing the data structure of a Hypertext Markup Language (HTML) UI (User Interface) Control in a Client-Server networked environment, the method comprising the steps of:

loading at least one Web page at a client Web browser, said Web browser provided with a Client-Side Data Manager and a Client-Side Proxy;

displaying, a HTML UI Control in the Web page within an application window at a client device;

upon detecting an event at the browser, invoking the Client-Side Data Manager to evaluate the event;

responsive to the event, generating a first request by making a first remote procedure call from the Client-Side Data Manager to the Client-Side Proxy to generate a first universal resource locator (URL);

building an Hypertext Transfer Protocol (HTTP) request for the first URL using the browser;

transmitting, to a first server, the HTTP request directed to a Server-Side Proxy;

invoking, at said first server at a Server-Side Data Query Engine, program code based on said HTTP request to query an information system;

receiving, at said application window from said Server-Side Proxy, an HTTP response containing the results of said query;

unpacking said HTTP response at said browser using said Client-Side Proxy;

executing a callback function at the Client-Side Proxy to make said HTTP response available to the Client-Side Data Manager; and causing the Client-Side Data Manager to interact with the HTML UI Control based on the results of said query contained in the HTTP response;

wherein said transmitting and said receiving actions are accomplished without refreshing said Web page displaying said HTML UI Control.

2. A method as defined in claim 1, wherein said HTML UI Control is a form.

3. A method as defined in claim 1, wherein said HTML UI Control is a grid.

4. A method as defined in claim 1, wherein said HTML UI Control is a listview.

5. A method as defined in claim 1, wherein said HTML UI Control is a menu.

6. A method as defined in claim 1, wherein said HTML UI Control is a treeview.

7. A method as defined in claim 1, wherein said HTML UI Control displays at least a portion of a list of items.

8. A method as defined in claim 1, wherein said Web page is contained in a HTML frame.

9. A method as defined in claim 1, wherein said Web page contains a HTML inline frame.

10. A method as defined in claim 1, wherein said application window is a Web browser window.

11. A method as defined in claim 1, wherein said Web page has means for storing the data structure of said HTML UI Control in a JavaScript object.

12. A method as defined in claim 11, wherein said JavaScript object is a multidimensional array.

13. A method as defined in claim 1, wherein said transmitting and said receiving actions are accomplished without the use of Web browser plugins.

14. A method as defined in claim 1, wherein the transmission of said HTTP request and response is accomplished through a non-persistent HTTP connection.

15. A method as defined in claim 1, wherein said information system is a database.

16. A method as defined in claim 1, wherein said information system is a network domain.

17. A method as defined in claim 1, wherein said information system is a file system.

18. A method as defined in claim 1, wherein said results are evaluated by a JavaScript function accessible by said Web page.

19. A method as defined in claim 18, wherein the evaluation of said JavaScript function results in a visual alteration of the displayed HTML UI Control.

20. A method for retrieving and editing the data structure associated with a Hypertext Markup Language (HTML) UI (User Interface) in a Client-Server networked environment comprising the steps of:

displaying, an HTML UI Control with an associated data structure in a Web page within an application window at a client Web browser, said Web browser provided with a Client-Side Date Manager and a Client-Side Proxy, said Web page having means for storing the data associated with the data structure of said HTML UI Control;

upon detecting an event at the browser, invoking the Client-Side Data Manager to evaluate the event;

on said event being directed to editing the data structure, sending a first request to execute a remote procedure call (RPC) from said Client-Side Data Manager to said Client-Side Proxy;

executing said RPC over Hypertext Transfer Protocol (HTTP) to generate an HTTP request, said RPC being executed by one of an HTTP "GET" request through the HTML <script> tag and an HTTP "POST" request through the HTML <form> tag;

transmitting, from said Client-Side Proxy to Server-Side Proxy, said HTTP request containing at least one function name and at least one parameter, wherein a program code of said at least one function name resides at a Server-Side Data Query Engine;

causing said Server-Side Proxy to invoke said program code at said Server-Side Data Query Engine to query an information system based on the evaluation of said at least one function name and said at least one parameter and send an HTTP response to said Server-Side Proxy;

receiving, at said Client-Side Proxy in said application window, the HTTP response containing results of the execution of said query upon said information system, said HTTP response received through one of an HTML <script> tag and an HTML <iframe> tag corresponding to said HTML "GET" and said HTML "POST" request, respectively;

unpacking the HTTP response at said Client-Side Proxy and passing said results to said Client-Side Data Manager; and editing said data structure using said results;

wherein the said transmitting and said receiving actions are accomplished without refreshing said Web page displaying said HTML UI Control with the data structure.

21. A method as defined in claim 20, wherein said HTML UI Control is a form.

22. A method as defined in claim 20, wherein said HTML UI Control is a grid.

23. A method as defined in claim 20, wherein said HTML UI Control is a listview.

24. A method as defined in claim 20, wherein said HTML UI Control is a menu.

25. A method as defined in claim 20, wherein said HTML UI Control is a treeview.

26. A method as defined in claim 20, wherein said HTML UI Control displays at least a portion of a list of items.

27. A method as defined in claim 20, wherein said Web page is contained in an HTML frame.

28. A method as defined in claim 20, wherein said Web page contains an HTML inline frame.

29. A method as defined in claim 20, wherein said application window is a Web browser window.

30. A method as defined in claim 20, wherein said data structure is stored in a JavaScript object.

31. A method as defined in claim 30, wherein said JavaScript object is a multidimensional array.

32. A method as defined in claim 20, wherein said transmitting and said receiving actions are accomplished without the us of Web browser plugins.

33. A method as defined in claim 20, wherein the transmission of said HTTP request and response is accomplished through a non-persistent HTTP connection.

34. A method as defined in claim 20, wherein said information system is a database.

35. A method as defined in claim 20, wherein said information system is a network domain.

36. A method as defined in claim 20, wherein said information system is a file system.

37. A method as defined in claim 20, wherein said results are evaluated by a JavaScript function accessible by said Web page.

38. A method as defined in claim 37, wherein the evaluation of said JavaScript function results in a visual alteration of the displayed HTML UI Control.

39. A system for retrieving and editing the data structure of a HyperText Markup Language (HTML) UI (User Interface) Control comprising:

means for displaying, at least one HTML UI Control with an associated data structure in at least one Web page within an application window at a client Web browser, said Web browser provided with a Client-Side Date Manager and a Client-Side Proxy;

means for storing the data structure associated with the at least one HTML UI Control of the at least one Web page in a memory;

means for invoking the Client-Side Data Manager to evaluate event detected at browser;

means for sending a first request to execute a remote procedure call (RPC) from said Client-Side Data Manager to said Client-Side Proxy in response to said event;

means for executing a said RPC over Hypertext Transfer Protocol (HTTP) to generate an HTTP request;

means for transmitting from said Client-Side Proxy to a Server-Side Proxy, said HTTP request containing at least one function name and at least one parameter, wherein a program code of said function names resides at a Server-Side Data Query Engine;

means for executing said program code at said Server-Side Data Query Engine to a query to a remote information system from said Web pages based on the evaluation of said at least one function name and, said at least one parameter;

means for receiving an HTTP response containing the results of the execution of said query at said Client-Side Proxy in said Web pages, said HTTP response received through one of an HTML <script> tag and an HTML <iframe> tag corresponding to said HTML "GET" and said HTML "POST" request, respectively;

means for processing said results a said Web pages by unpacking the HTTP response at said Client-Side Proxy and passing said results to said Client-Side Data Manager; and means for editing said data structure using said results;

wherein said transmitting and said receiving actions are accomplished without refreshing said Web page displaying said HTML UI Control with the data structure.

40. The system of claim 39, wherein said means for storing the data structure associated with at least one HTML UI Control of a least one Web page in a memory comprises:

means for appending data to said data structure stored in said memory.

41. The system of claim 39, wherein said means for storing the data structure associated with at least one HTML UI Control of at least one Web page in a memory comprises:

means for searching said data structure stored in said memory; and means for replacing the data of said data structure stored in said memory.

42. The system of claim 39, wherein said means for executing a query to a remote information system from said Web pages comprises:

means for preparing the necessary parameters of said RPC to a specified function at a server;

means for packaging said RPC as an HTTP request; and means for executing said specified function at said server.

43. The system of claim 39, wherein said means for returning the results of said query to said Web pages comprises:

means for preparing said results as at least one parameter of a function call; and means for packaging said results as said HTTP response; and means for returning said HTTP response to said Web pages.

44. The system of claim 43, wherein means for preparing said results as at least one parameter of a function call comprises:

means for packaging said results as at least one delimited string.

45. The system of claim 39, wherein means for processing said results at said Web pages comprises:

means for passing said results to at least one function of said Web pages; and means for executing said at least one function to process said results.

46. The system of claim 45, wherein means for executing said functions to process said results comprises:

means for parsing at least one delimited string containing said results.

* * * * *

UNITED STATES PATENT AND TRADEMARK OFFICE
CERTIFICATE OF CORRECTION

PATENT NO. : 6,944,828 B2 Page 1 of 1
APPLICATION NO. : 10/014139
DATED : September 13, 2005
INVENTOR(S) : Gao et al.

It is certified that error appears in the above-identified patent and that said Letters Patent is hereby corrected as shown below:

Col. 3, line 22: Please change "controls" to --Controls--

Col. 5, line 34: Please change "controls" to --Controls--

Col. 5, line 54: Please change "a" to --an--

Col. 7, line 64: Please change "(□)" to --.quadrature.--

Col. 8, line 1: Should read --would be "*OK* .vertline.A.1,null.vertline.A.2,null.vertline.*". If the select query--.

Col. 8, line 23: Please change "Thus" to --Thus,--

Col. 9, line 25: Please change "Thus" to --Thus,--

Col. 12, line 46: Please insert --an-- after "evaluate" and --the-- before "browser"

Col. 12, line 55: Should read -- wherein a program code of said function names resides at a Server-Side Data Query Engine;--

Col. 12, line 58: Please remove the "a" before "query"

Col. 13, line 1: Please replace "a" with --at--

Signed and Sealed this

Third Day of April, 2007

JON W. DUDAS
*Director of the United States Patent and Trademark Office*